US011449090B2

(12) United States Patent
Zhang

(10) Patent No.: US 11,449,090 B2
(45) Date of Patent: Sep. 20, 2022

(54) SYNCHRONIZING SENSING SYSTEMS

(71) Applicant: Ford Global Technologies, LLC, Dearborn, MI (US)

(72) Inventor: Linjun Zhang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 670 days.

(21) Appl. No.: 16/435,698

(22) Filed: Jun. 10, 2019

(65) Prior Publication Data

US 2020/0387189 A1    Dec. 10, 2020

(51) Int. Cl.
*G06F 1/12* (2006.01)
*H04W 4/46* (2018.01)
*H04W 4/44* (2018.01)
*G08G 1/16* (2006.01)

(52) U.S. Cl.
CPC .............. *G06F 1/12* (2013.01); *G08G 1/162* (2013.01); *H04W 4/44* (2018.02); *H04W 4/46* (2018.02)

(58) Field of Classification Search
CPC ........... G06F 1/12; G08G 1/162; H04W 4/44; H04W 4/46; H04W 56/001; H04J 3/0661
See application file for complete search history.

(56) References Cited

U.S. PATENT DOCUMENTS

| | | | |
|---|---|---|---|
| 7,190,946 B2 | 3/2007 | Mazzara, Jr. et al. | |
| 8,504,864 B2 | 8/2013 | Menon et al. | |
| 10,608,764 B2* | 3/2020 | Chaloupka | H04J 3/0644 |
| 2003/0103486 A1* | 6/2003 | Salt | G06F 1/14 |
| | | | 370/503 |
| 2015/0127284 A1* | 5/2015 | Seshan | G01D 21/00 |
| | | | 702/89 |
| 2019/0072641 A1* | 3/2019 | Al-Stouhi | G01S 7/003 |
| 2019/0094370 A1 | 3/2019 | Tawadrous et al. | |
| 2019/0253168 A1* | 8/2019 | Hansson | H04L 69/22 |
| 2020/0014525 A1* | 1/2020 | Nasr | G05D 1/021 |

FOREIGN PATENT DOCUMENTS

| | | |
|---|---|---|
| CN | 108712733 A | 10/2018 |
| DE | 102010029465 A1 | 12/2011 |
| DE | 102017200790 A1 | 7/2018 |
| WO | 2019036578 A1 | 2/2019 |

\* cited by examiner

*Primary Examiner* — Kim Huynh
*Assistant Examiner* — Cory A. Latham
(74) *Attorney, Agent, or Firm* — Frank A. MacKenzie; Bejin Bieneman PLC

(57) ABSTRACT

A plurality of messages can be received from a remote device, each of the messages including a respective sent time from the remote device. A receiver can store a respective receipt time of each of the messages. A computer clock can be adjusted based on a first difference between respective sent times and a second difference between respective receipt times.

18 Claims, 7 Drawing Sheets

SYNCHRONIZING SENSING SYSTEMS

BACKGROUND

Vehicle-to-infrastructure (V2I) and vehicle-to-vehicle (V2V) communications can allow can allow for vehicles to provide each other and/or infrastructure elements with data about objects in an environment local to vehicle(s) and infrastructure(s), and vice-versa. For example, the infrastructure element may be able to provide data about objects, hazards, etc., in the area to support a vehicle's path planning, e.g., avoidance of hazards and objects, and/or vehicles may be able to provide each other with such data.

DESCRIPTION

Overview

Figure 1:
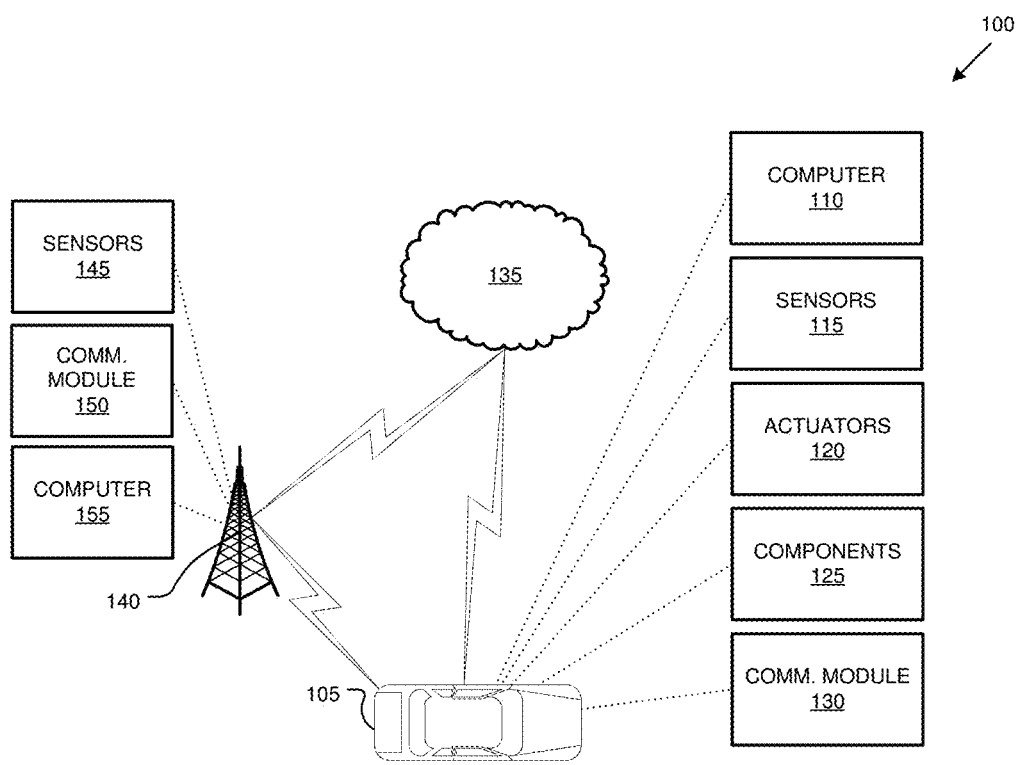
FIG. 1 is a block diagram illustrating an example traffic communications and control system.

A system comprises a computer including a processor and a memory, the memory storing instructions executable by the processor to receive a plurality of messages from a remote device, each of the messages including a respective sent time from the remote device; store, in a receiver, a respective receipt time of each of the messages; and adjust a clock of the computer based on a first difference between respective sent times and a second difference between respective receipt times.

The instructions to adjust the clock of the computer can further include instructions to adjust the clock of the computer with respect to a second clock of the computer in addition to the first and second differences.

The instructions can further comprise instructions to send a plurality of outbound messages to the remote device; record respective send times for each of the outbound messages; record respective receipt times for respective inbound messages that are each identified as a response to one of the outbound messages; determine a plurality of communication latencies for each outbound message and corresponding inbound message; upon a determination that a first statistical measure of the communication latencies is below a first threshold and a second statistical measure is below a second threshold, adjust the clock of the computer based on a first difference between respective sent times and a second difference between respective receipt times by setting the clock to be the same as a second clock of the computer; and upon a determination that the first statistical measure of the communication latencies is above the first threshold or the second statistical measure is above the second threshold, adjust the clock of the computer based on determining a decrease in successive differences between respective sent times and a second difference between respective receipt times by setting the clock to be the same as a second clock of the computer. The first statistical measure or the second statistical measure can include an average of the latencies, a standard deviation of the latencies, or a maximum value of the latencies.

The remote device can be mounted to a roadside infrastructure element. The computer can be in a vehicle.

The instructions can further comprise instructions to assign a timestamp to received sensor data based on the clock.

The instructions can further comprise instructions to actuate a vehicle component based on the clock.

Generating the synchronized clock with the receiver can include assigning a timestamp to data from the remote device according to an internal clock of the computer.

The instructions can further comprise instructions to update the synchronized clock after sending an additional outbound message and receiving an additional corresponding inbound message.

A method comprises receiving a plurality of messages from a remote device, each of the messages including a respective sent time from the remote device; storing, in a receiver, a respective receipt time of each of the messages; and adjusting a clock of the computer based on a first difference between respective sent times and a second difference between respective receipt times.

Adjusting the clock of the computer can further include adjusting the clock of the computer with respect to a second clock of the computer in addition to the first and second differences.

The method can further comprise sending a plurality of outbound messages to the remote device; recording respective send times for each of the outbound messages; recording respective receipt times for respective inbound messages that are each identified as a response to one of the outbound messages; determining a plurality of communication latencies for each outbound message and corresponding inbound message; upon a determining that a first statistical measure of the communication latencies is below a first threshold and a second statistical measure is below a second threshold, adjusting the clock of the computer based on a first difference between respective sent times and a second difference between respective receipt times by setting the clock to be the same as a second clock of the computer; and upon a determining that the first statistical measure of the communication latencies is above the first threshold or the second statistical measure is above the second threshold, adjusting the clock of the computer based on determining a decrease in successive differences between respective sent times and a second difference between respective receipt times by setting the clock to be the same as a second clock of the computer. The method first statistical measure or the second statistical measure can include an average of the latencies, a standard deviation of the latencies, or a maximum value of the latencies.

The remote device can be mounted to a roadside infrastructure element. The computer can be in a vehicle.

The method can further comprise assigning a timestamp to received sensor data based on the clock.

The method can further comprise actuating a vehicle component based on the clock.

Generating the synchronized clock with the receiver can includes assigning a timestamp to data from the remote device according to an internal clock of the computer.

The method can further comprise updating the synchronized clock after sending an additional outbound message and receiving an additional corresponding inbound message.

Exemplary System

Introduction

Figure 2:
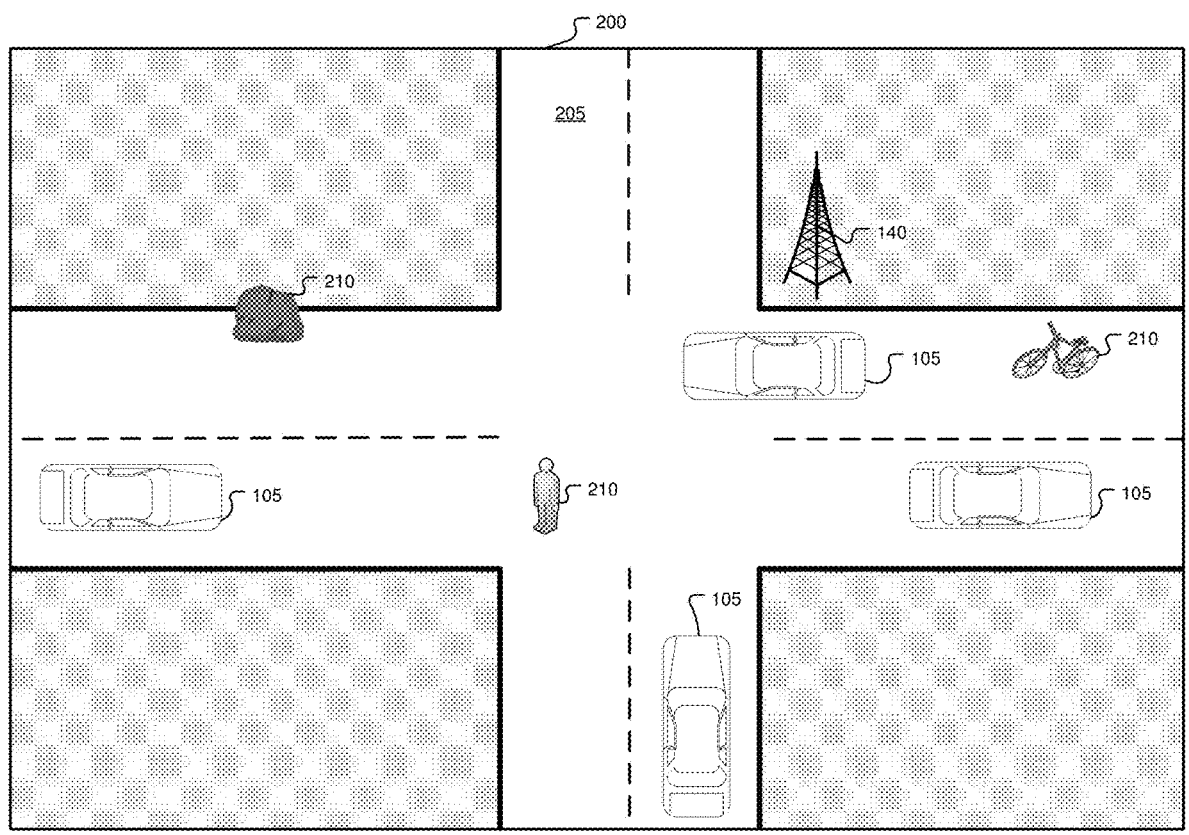
FIG. 2 is a diagram illustrating an example traffic scene in which the system of FIG. 1 could be implemented.

FIG. 1 is a block diagram of an example infrastructure communications and control system (or infrastructure system) 100. One or more vehicles 105 can provide data to each other and/or to one or more infrastructure elements 140. One each of a vehicle 105 and infrastructure element 140 are shown in FIG. 1 for ease of illustration; FIG. 2 illustrates a traffic scene or area 200 in which an infrastructure element 140 and a plurality of vehicles may exchange data with one another, e.g., data about roads 205, objects 210, and other features of a local environment.

Figure 3:
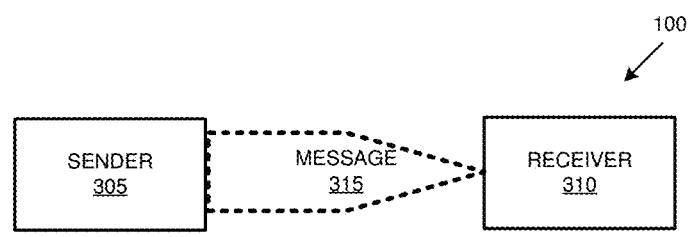
FIG. 3 is a simplified block diagram of a sender sending a message to a receiver in the context of the system of FIG. 1.

FIG. 3 is a simplified or generalized block diagram illustrating the transmission of data including sensor 115, 145 data and/or data about objects. In the context of FIG. 3, a sender 305 and/or a receiver 310 of a message 315 transmitted from the sender 305 to the receiver 310 can be either of a vehicle 105 or an infrastructure 140. Further, a sender 305 can record a timestamp specifying a time when a message 315 was sent; a receiver 310 can record a timestamp specifying a time when a message 315 was received.

The system 100 resolves problems that exist with respect to synchronizing messages is sent and received via V2V and V2I communications and the like, especially when a sender 305 and receiver 310 lack, or it is desirable to avoid using, a common reference clock. For example, existing techniques can require a global or external reference clock, such as provided via the global position system (GPS) or the like. Such a reference clock may be unavailable in certain scenarios (e.g., a vehicle 105 is in a tunnel, indoor garage, area surrounded by tall buildings, etc.). Moreover, even if available, synchronizing data with such an external clock can be expensive in terms of processing and message bandwidth; these processing and bandwidth demands can be eliminated by the techniques disclosed herein.

Vehicle

A vehicle 105 typically (but not necessarily) is a land vehicle such as a car, truck, etc. Additionally or alternatively, a vehicle 105 may include a bicycle, a motorcycle, etc. A vehicle 105 includes a vehicle computer 110, sensors 115, actuators 120 to actuate various vehicle components 125, and a vehicle communications module 130. The communications module 130 allows the vehicle computer 110 to communicate with one or more infrastructure elements 140 and a central server 170, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

A vehicle computer 110 includes a processor and a memory such as are known. The memory includes one or more forms of computer-readable media, and stores instructions executable by the computer 110 for performing various operations, including as disclosed herein.

The computer 110 may operate a vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the computer 110; in a semi-autonomous mode the computer 110 controls one or two of vehicles 105 propulsion, braking, and steering; in a non-autonomous mode a human operator controls each of vehicle 105 propulsion, braking, and steering.

The computer 110 may include programming to operate one or more of vehicle 105 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 105 network such as a communications bus as described further below, more than one processor, e.g., included in electronic controller units (ECUs) or the like included in the vehicle for monitoring and/or controlling various vehicle components 125, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 105 network, the computer 110 may transmit messages to various devices in the vehicle and/or receive messages (e.g., CAN messages) from the various devices, e.g., sensors 115, an actuator 120, an human machine interface (HMI), etc. Alternatively or additionally, in cases where the computer 110 actually comprises a plurality of devices, the vehicle 105 communication network may be used for communications between devices represented as the computer 110 in this disclosure. Further, as mentioned below, various controllers and/or sensors 115 may provide data to the computer 110 via the vehicle communication network.

Vehicle 105 sensors 115 may include a variety of devices such as are known to provide data to the computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 101, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via a vehicle-to-vehicle communication module or interface 130 with devices outside of the vehicle 105, e.g., through a vehicle-to-vehicle (V2V) or vehicle-to-infrastructure (V2X) wireless communications (cellular and/or DSRC, etc.) to another vehicle—to an infrastructure element 140 (typically via direct radio frequency communications) and/or (typically via the network 135) a remote server 170. The module 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the module 130 can include cellular, Bluetooth, IEEE 802.11, dedicated short range communications (DSRC), cellular V2X (CV2X), and the like.

Network

The network 135 represents one or more mechanisms by which a vehicle computer 110 may communicate with an infrastructure element 140 and/or central server 170. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, Dedicated Short Range Communications (DSRC), Cellular Vehicle-to-Everything Communication (CV2x) etc.), local area networks (LAN) and/or wide area networks (WAN), including the Internet, providing data communication services.

Infrastructure Element

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each sensor 145 is mounted to the infrastructure element so as to have a substantially unmoving and unchanging field of view. For convenience, "infrastructure" may be abbreviated to "IX," e.g., in labels in the figures.

Sensors 145 thus provide field of views in contrast to vehicle 105 sensors 115 in a number of advantageous respects. First, because sensors 145 have a substantially constant field of view, determinations of vehicle 105 and object locations can be accomplished with fewer and simpler processing resources than if movement of the sensors 145 also had to be accounted for. Further, the sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, sensors 145 can communicate with the element 140 computer 155 via a wired connection, whereas vehicles 105 typically can communicates with elements 140 and/or a server 170 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

Example Environment

Turning to FIG. 2, an infrastructure element 140 can be provided to monitor defined area 200 around the infrastructure element 140. For example, the defined area 200 could be an area that is proximate to the infrastructure element 140. In the present context, "proximate" means that the area 200 is defined by a field of view of one or more element 140 sensors 145. The defined area 200 could alternatively be an area defined by a radius around the element 140 or some other distance or set of distances relative to the infrastructure element 140.

In addition to vehicles 105, an area 200 can include other objects 210, e.g., a pedestrian object 210, a boulder object 210, a bicycle object 210, etc., i.e., an area 200 could alternatively or additionally include many other objects 210, e.g., bumps, potholes, curbs, berms, fallen trees, litter, construction barriers or cones, etc. Objects 210 can be specified as being located according to a coordinate system for an area 200 maintained by a vehicle computer 110 and/or infrastructure 140 computer 155, e.g., according to a Cartesian coordinate system or the like specifying coordinates in the area 200. Additionally, data about an object 210 could specify characteristics of a hazard or object in a sub-area such as on or near a road 205, e.g., a height, a width, etc.

Data and Messages

FIG. 3 is a simplified block diagram of a sender 305 sending a message 315 to a receiver 310 in the context of the system 100 of FIG. 1. As is known, computers 110, 155 can be programmed to encode and serialize, i.e., convert to a string of bits, data, such as data describing objects 210, so that the data can be included in a message 315 comprising packets that include the serialized data (or, in each of a plurality of packets, a portion thereof) as a payload, the message being transmitted to or from vehicle(s) 105 and/or infrastructure(s) 140, i.e., senders 305 and receivers 310. A sender 305 or a receiver can each be a vehicle 105 or infrastructure element 140 (e.g., via a communications module 130, 150). Further, the system 100 can include a plurality of senders 305 and/or a plurality of receivers 310. For example, as discussed further below, a receiver 310 could receive a plurality of messages 315 about an object 210 from a respective senders 305.

The message 315 can include data that is encoded and/or serialized according to known techniques, serialization of data structures or data objects into a format for storage, e.g., in a file, a memory, a buffer, etc., being well known. Further, encoding techniques are known, e.g., For example, vehicular communications commonly use ASN (abstract syntax notation) encoding rules, which are more generally used in telecommunications. Other example possible encoding/encapsulation schemes include Protocol Buffers (Google), CORBA, COM (Component Object Model), and the like. Once data is encoded and serialized, a message 315 can include one or more packets. Data packets, as are known, can include headers and payloads data about objects, and also respective timestamps or values such as $T_{veh\_sent}$ and $t_{IX\_sent}$ (explained below) can be included in a payload or payloads of a packet or packets in a message 315.

A sender 305 and receiver 310 are typically devices, e.g., a vehicle computer 110 and infrastructure computer 155, that are remote from one another. In this context, remote devices are devices that are not in or on a same physical structure (such as a same building, vehicle 105, infrastructure element 140, etc.), and that communicate wirelessly.

Latency Determination

Table 1 lists and explains data values used to synchronize clocks between a sender 305 and a receiver 310, specifically, in the exemplary context of a vehicle computer 110 and infrastructure computer 155. The data values included in Table 1 include timestamps. The term "timestamp" as used herein is intended to have its plain and ordinary meaning. However, for clarity and avoidance of doubt, a "timestamp" herein should be understood to specify a clock time stored or recorded for an acquisition and/or determination of a data value. The clock time can be a clock time maintained by a computer 110, 155.

TABLE 1

| Variable | Explanation |
|---|---|
| $T_{veh\_sent}$ | A timestamp assigned by the vehicle computer 110 as a time at which it sends a message 315 to an infrastructure computer 155. |
| $T_{veh\_rcpt}$ | A timestamp assigned by the vehicle computer 110 as a time at which it receives a reflected response to a message 315 from an infrastructure computer 155. |
| $L_{est}$ | An estimated time (or latency) between a time when a sender 305 sends a message 315, and a time $T_{rcpt}$ when a receiver 310 receives the message 315. $L_{est}$ can be determined as $(T_{rcpt} - T_{sent})/2$. |
| $t_{IX\_sent}$ | A timestamp assigned by an infrastructure computer 155 as a time at which it sends a message 315 to a vehicle computer 110. |
| $L_{act}$ | An actual or true communications latency of a message 315, i.e., a time for a message 310 to travel from a sender 305 to a receiver 310. A problem addressed in this disclosure is estimating $L_{act}$ even when it cannot be directly determined, e.g., because a sender 305 and receiver 310 lack a common reference clock such as a GPS clock. |
| θ | A difference (i.e., measured as an amount of time) between a clock time provided by a sender 305 and a clock time provided by a receiver 310 at a same actual time. |
| $T_{veh\_rcpt\_opt}$ | A timestamp assigned by the vehicle computer 110 as a time at which it receives a response to a message 315 from an infrastructure computer 155, where the message 315 is associated with a minimum latency in a series of messages 315. |
| $t_{IX\_sent\_opt}$ | A timestamp assigned by an infrastructure computer 155 as a time at which it sends a message 315 to a vehicle computer 110, where the message 315 is associated with a minimum latency in a series of messages 315. |
| C | A virtual clock (i.e., a reference clock time determined according to program instructions rather than being specified in a message from an external source, e.g., the GPS, and/or determined internally as a conventional computer 110, 155 clock time) that can be determined by a computer 110 as a synchronized clock with another computer such as an infrastructure computer 155. |

When an infrastructure computer 155 sends a message 315 to a vehicle computer 110, the infrastructure computer 155 can store a timestamp $t_{IX\_sent}$, and the vehicle computer 110, upon receiving the message 315, can store a timestamp $T_{veh\_rcpt}$. Without a common reference clock, even if the computers 110, 155 share the timestamps with one another, the vehicle computer 110 cannot determine the timestamp $t_{IX\_sent}$ with respect to its internal clock, and the infrastructure computer 155 likewise cannot determine the timestamp $T_{veh\_rcpt}$ with respect to its internal clock. Thus, neither of the computers 110, 155 can determine the actual latency $L_{act}$. However, the following relationship holds for a $k^{th}$ message 315 in a series of messages 315:

$$T_{veh\_rcpt\_k} = t_{IX\_sent\_k} + \theta_k + L_{act\_k} \quad (1).$$

Then:

$$\theta_k = T_{veh\_rcpt\_k} - t_{IX\_sent\_k} - L_{act\_k} \quad (2).$$

Further, for a message 315 k−1:

$$\theta_{k-1} = T_{veh\_rcpt\_k-1} - t_{Ix\_sent\_k-1} - L_{act\_k-1} \quad (3).$$

We assume that the difference between the computer 110, 155 clocks stays constant over time, so that $$\theta_k = \theta_{k-1} \quad (4).$$

Therefore:

$$T_{veh\_rcpt\_k} - t_{IX\_sent\_k} - L_{act\_k} = T_{veh\_rcpt\_k-1} - t_{IX\_sent\_k-1} - L_{act\_k-1} \quad (5).$$

And, re-writing equation (5):

$$L_{act\_k} - L_{act\_k-1} = T_{veh\_rcpt\_k} - T_{veh\_rcpt\_k-1} - (t_{IX\_sent\_k} - t_{IX\_sent\_k-1}) \quad (6).$$

Thus, even if a vehicle computer 110 cannot measure or determine an actual latency $L_{act}$ for a given message 315, the computer 110 can determine, for successive messages 315, differences between respective actual latencies, and hence whether the actual latency is increasing, decreasing, or unchanging. For example, if $L_{act\_k} - L_{act\_k-1} < 0$, then the computer 110 can determine that the actual latency $L_{act\_k}$ for the $k^{th}$ message 315 is smaller than the actual latency $L_{act\_k-1}$ for the immediately prior message 315.

Processes

Figure 4:
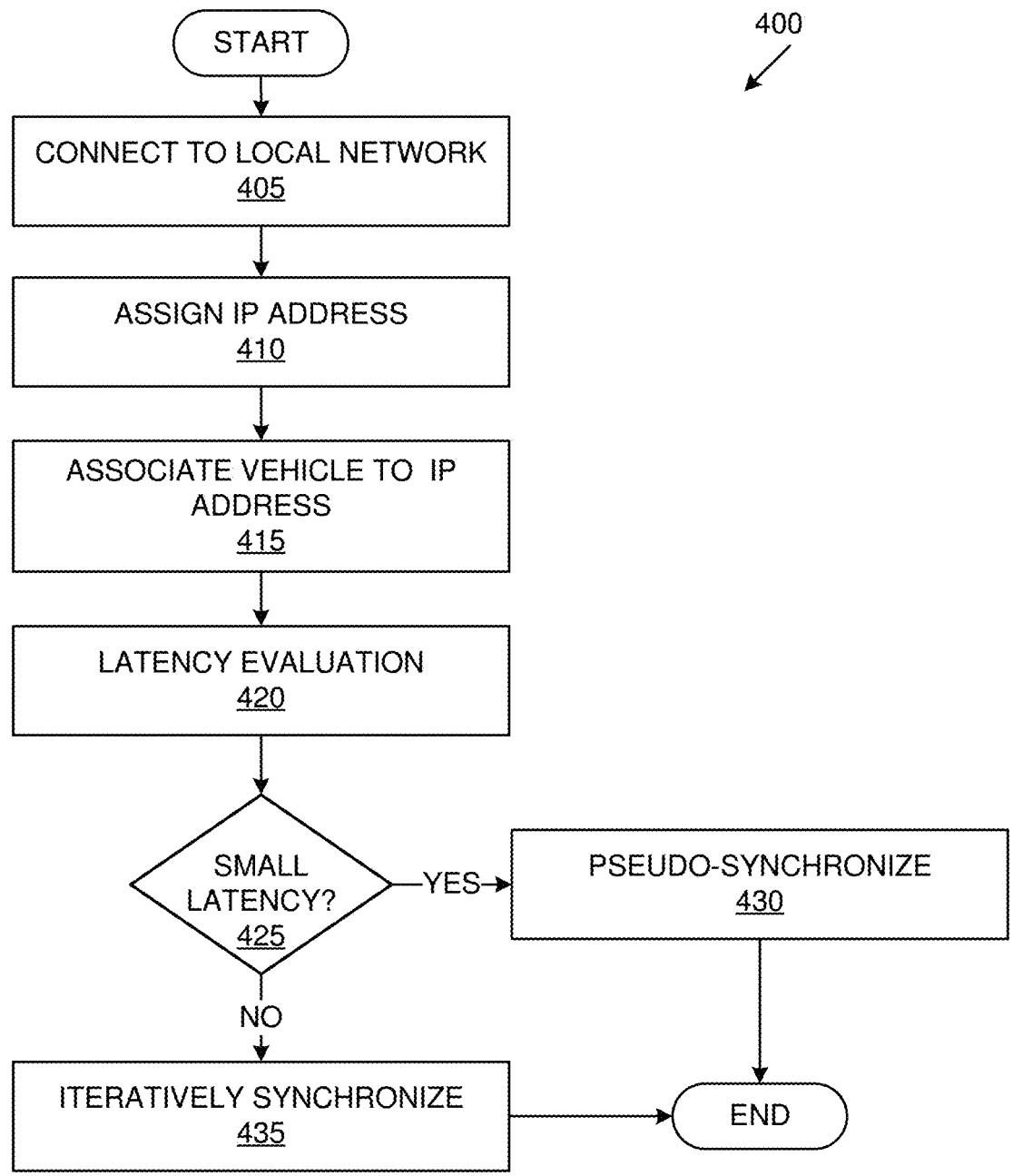
FIG. 4 is a flowchart of an exemplary process for a vehicle computer infrastructure computer to communicate, and to select a technique for synchronizing clocks of message senders and receivers, such as synchronizing a computer clock with a clock of an infrastructure computer.

FIG. 4 is a flowchart of an exemplary process 400 for a message sender and receiver such as a vehicle computer 110 and infrastructure computer 155 to communicate, and to select a technique for synchronizing a computer 110 clock, with a clock of an infrastructure computer 155. Steps or blocks of the process 400 may be executed by a processor of the computer 110 according to instructions stored in a memory thereof and/or by a processor of the computer 155 according to instructions stored in a memory thereof.

The process 400 begins in a block 405, in which a vehicle 105 enters proximity of an infrastructure element 140, and connects to a local network, e.g., a Wi-Fi® network or the like, provided by the infrastructure element 140. For example, the vehicle computer 110 could be programmed to automatically connect to a local network provided by an infrastructure element 140 upon detecting a broadcast service set identifier (SSID) or the like of the element 140.

Next, in a block 410, the computer 155 (or a network router or the like included in the infrastructure communication module 150) assigns an Internet protocol (IP) address to the vehicle computer 110, e.g., in a conventional manner.

Next, in a block 415, the computer 155 generates identifying information for the vehicle 105 to which the IP address was assigned in the block 410. For example, the vehicle 105 could provide identifying information such as one or more of a make, model, color, speed, direction of travel, location, etc., and/or such identifying information could be determined by the computer 155 according to sensor 145 data. The block 415 can be referred to as registering the vehicle 105 to the infrastructure element 140.

Next, in a block 420, the vehicle computer 110 exchanges messages 315, e.g., in steps described more fully with respect to the process 500 illustrated with respect to FIG. 5 and discussed below, to determine whether a latency of messages 315 between the vehicle 105 and infrastructure element 140 is small or large.

Next, in a block 425, if the latency determined in the block 420 is small, then a block 430 is executed next. Otherwise, a block 435 is executed next.

In the block 430, which can follow the block 425, the computer 110 executes programming to ignore communications latency between the infrastructure computer 155 and the vehicle computer 110, i.e., performs what can be referred to as a pseudo-synchronization of its clock with the clock of the infrastructure computer 155. In other words, based on determining that a latency is small, as described further below with respect to FIG. 5, the computer 110 can operate with data from the infrastructure computer 155 and its associated sensors 145 as if there were no communications latency because the latency is negligible, i.e., has been determined to be small enough so as to allow use of received timestamps for sensor 145 data in the vehicle computer 110 as those timestamps were provided by sensors 145 and transmitted by the computer 155 in a message 315, i.e., the vehicle computer 110 can use timestamps from the computer 155 with reference to its own internal clock and without adjusting those timestamps. Further, one approach uses an average latency, e.g., a statistical measure of a series of latencies determined as described below regarding FIG. 5, as the approximate latency of each message 315. Because the latency is small, variance in latencies will be small, and the average provides a good estimate of the latency of each message 315.

In the block 435, which can also follow the block 425, the computer 110 iteratively synchronizes its clock with the clock of the infrastructure computer 155, e.g., according to an iterative synchronization process as described below with respect to FIG. 6.

As illustrated, the process 400 ends following one of the blocks 430, 435; however, it should be understood that the process 400 could be repeated as long as the vehicle 105 is proximate to, i.e., within local network range of, the infrastructure element 140.

Figure 5:
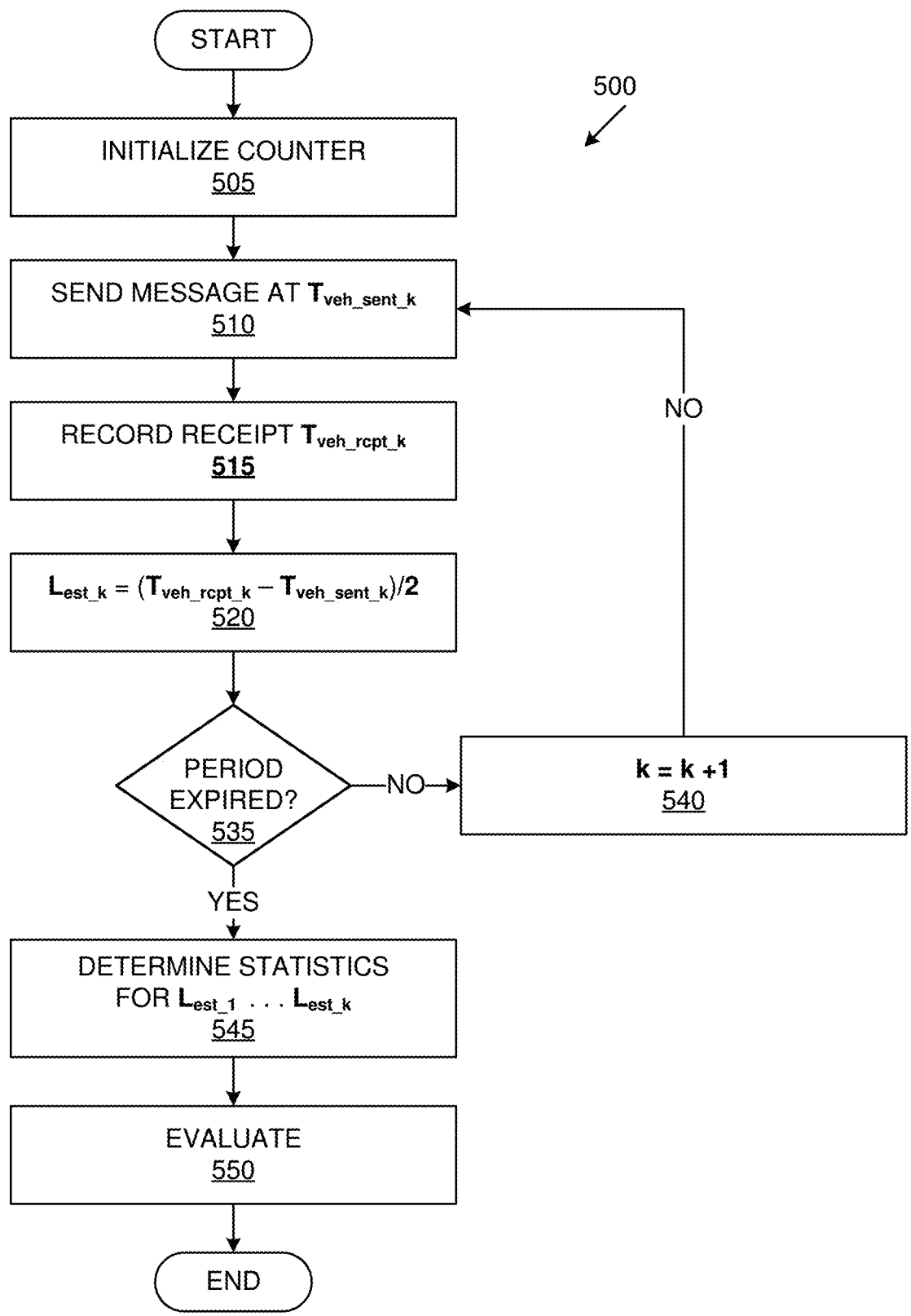
FIG. 5 is a flowchart of an exemplary process to determine whether a communications latency between a sender and a receiver such as vehicle and an infrastructure element is to be classified as small or large.

FIG. 5 is a flowchart of an exemplary process to determine whether a communications latency between a sender 305 and receiver 310 such as a vehicle 105 and an infrastructure element 140 is to be classified as small or large. Steps or blocks of the process 500 may be executed by a processor or processors of a computer 110, 155, according to instructions stored in a memory thereof.

The process 500 begins in a block 505, e.g., after a vehicle 105 has been registered to an infrastructure element 140 as described above with respect to the block 415 of the process 400, in which the vehicle computer 110 initializes a counter, e.g., sets a value k=1.

Next, in a block 510, the computer 110, e.g., via the communications module 130, sends a first message 315 to the infrastructure element computer 155. The computer 110 stores, and can include in the message 315 to the infrastructure element computer 155, a timestamp $T_{veh\_sent\_k}$ specifying a time at which the first message 315 was sent.

Next, in a block 515, the computer 110 receives a second message 315 from the infrastructure element computer 155, the second message 315 providing an identifier or other data indicating that it is in response to the first message 315. The computer 110 stores a timestamp $T_{veh\_rcpt\_k}$ specifying a time at which the second message 315 was received.

Next, in a block 520, the computer 110 evaluates an estimated latency for the current (i.e., in this example, $k^{th}$) received message 315 according to equation (7):

$$L_{est\_k}=(T_{veh\_rcpt\_k}-T_{veh\_sent\_k})/2 \qquad (7)$$

Next, in a block 525, the computer 110 determines whether a period of time for evaluating communication latency with the infrastructure element 140 has expired. For example, the computer 110 could include programming to send messages 315 as described above with respect to the block 510 at a specified frequency, e.g., 20 hertz, and to obtain responsive second messages 315 as described with respect to the block 515 for the period of time, e.g., 10 seconds. If the period of time has not expired, then a block 540 is executed next, in which the counter is incremented, whereafter the process 500 returns to the block 510. Otherwise, the process 500 proceeds to a block 545.

In the block 545, the computer 110 determines one or more statistical measures based on the k estimated latencies $L_{est}$ each determined in respective iterations of the block 520 described above. In one example, the determined statistical measures include an average, a standard deviation, and a maximum (i.e., a highest value of an estimated latency $L_{est}$ from all of the iterations of the block 520).

Next, in a block 550, the computer 110 evaluates the statistical measures determined in the block 545 and outputs an evaluation, e.g., that the communication latency between the infrastructure element 140 in the vehicle 105 is one of small or large. For example, the computer 110 could determine whether one or more statistical measures is below (or are below) a threshold or thresholds to determine that the estimated latency is small. In one example, the computer 110 is programmed to determine that each of the following is true to determine that there is a small latency: the average of the estimated latencies is below a first threshold (e.g., 10 milliseconds), and the standard deviation is below a second threshold (e.g., to milliseconds), and the maximum value is below a third threshold (e.g., 15 milliseconds).

Following the block 550, the process 500 ends; in one example, the process 500 outputs an evaluation of estimated latency used in the process 400 as described above.

Figure 6:
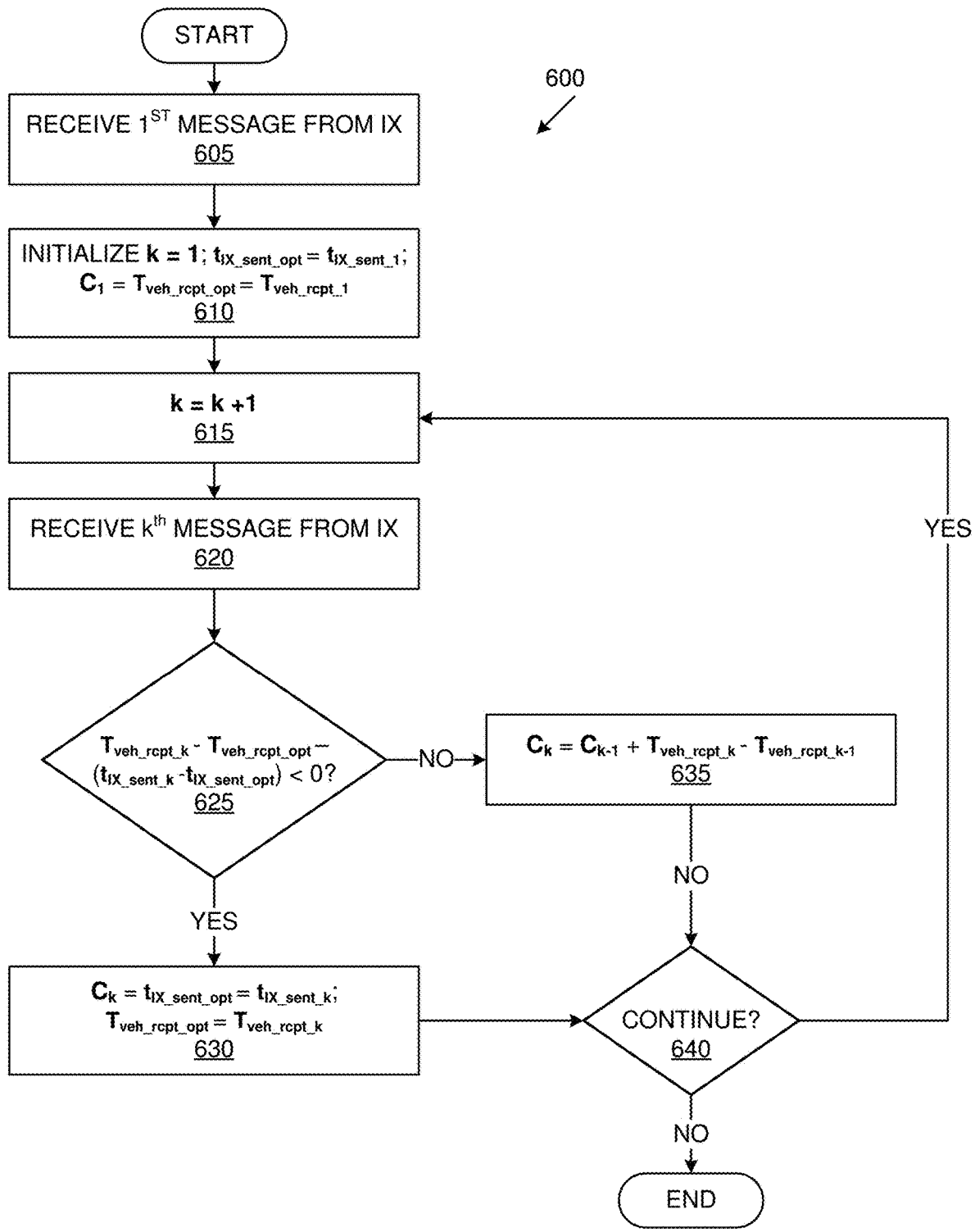
FIG. 6 is a flowchart of an exemplary process to iteratively determine a communications latency and synchronize clocks between a sender and a receiver such as a vehicle and infrastructure element.

FIG. 6 is a flowchart of an exemplary process 600 to iteratively determine a communications latency between a message 315 sender 305 and receiver 310 such as a vehicle 105 and infrastructure element 140. Steps or blocks of the process 600 may be executed by a processor of a computer 110 according to instructions stored in a memory thereof.

The process 600 begins in a block 605, e.g., upon a determination by the computer 110 as described with respect to the process 400 that a communication latency between a vehicle 105 and infrastructure element 140 is large. In the block 605, the computer 110 receives a first message 315 from the infrastructure element 140, i.e., it's computer 155.

Next, in a block 610, the computer 110 initializes a counter k=1, as well as values for current optimized timestamps, and a current optimized virtual clock, e.g., as follows:

$k=1;$ $t_{IX\_sent\_opt} = t_{IX\_sent\_1};$ $C_1 = T_{veh\_rcpt\_opt} = T_{veh\_rcpt\_1}.$ Next, in a block 615, the computer 110 increments the counter.

Next, in a block 620, the computer 110 receives a $k^{th}$ message 315 from the infrastructure element 140.

Next, in a block 625, the computer 110 evaluates the expression:

$T_{veh\_rcpt\_k} - T_{veh\_rcpt\_opt} - (t_{IX\_sent\_k} - t_{IX\_sent\_opt}) < 0.$ Note that this expression is based on equation (6) above, and determines whether a an actual $k^{th}$ latency $L_{act\_k}$ is increasing or decreasing, i.e., if the expression evaluates to true, decreasing, compared to an immediately prior actual latency $L_{act\_k-1}$. If the expression evaluates to true, then a block 630 is executed next. If the expression evaluates to false, then a block 635 is executed next.

In the block 630, the computer 110 sets values for the current optimized virtual clock and the current optimized infrastructure sent timestamp and vehicle received timestamp as follows:

$C_k = t_{IX\_sent\_opt} = t_{IX\_sent\_k};$ $T_{veh\_rcpt\_opt} = T_{veh\_rcpt\_k}.$ In the block 635, the computer 110 sets values for the current optimized virtual clock as follows:

$C_k = C_{k-1} + T_{veh\_rcpt\_k} - T_{veh\_rcpt\_k-1}.$

Following either of the blocks 630, 635, in a decision block 640, the computer 110 determines whether to continue the process 600. For example, a vehicle 105 could leave proximity of an infrastructure element 140, e.g., a connection to the Wi-Fi network or the like of the infrastructure element 140 could be lost, whereupon the process 600 is terminated. However, if the process 600 is to continue to further determine latencies for messages 315 received in the vehicle 105 from the infrastructure element 140, then the process 600 returns to the block 615. Otherwise, the process 600 can end following one of the blocks 630, 635.

As noted above concerning the process 400, the computer 110 can use the virtual clock to adjust a timestamp $t_{IX\_sent}$ provided in a message 315 from the infrastructure element 140. That is, the computer 110 may use data in a message 315 to determine to actuate a vehicle 105 component 120 as described above, whereupon the computer 110 typically requires the data to have a timestamp with reference to a computer 110 clock and/or with respect to timestamps of data from vehicle 105 sensors 115. Accordingly, a difference between an internal clock of a vehicle 105 computer 110 and the virtual clock determined in the process 600 can specify an amount of adjustment of the timestamp $t_{IX\_sent}$ associated with data in a message 315.

Figure 7:
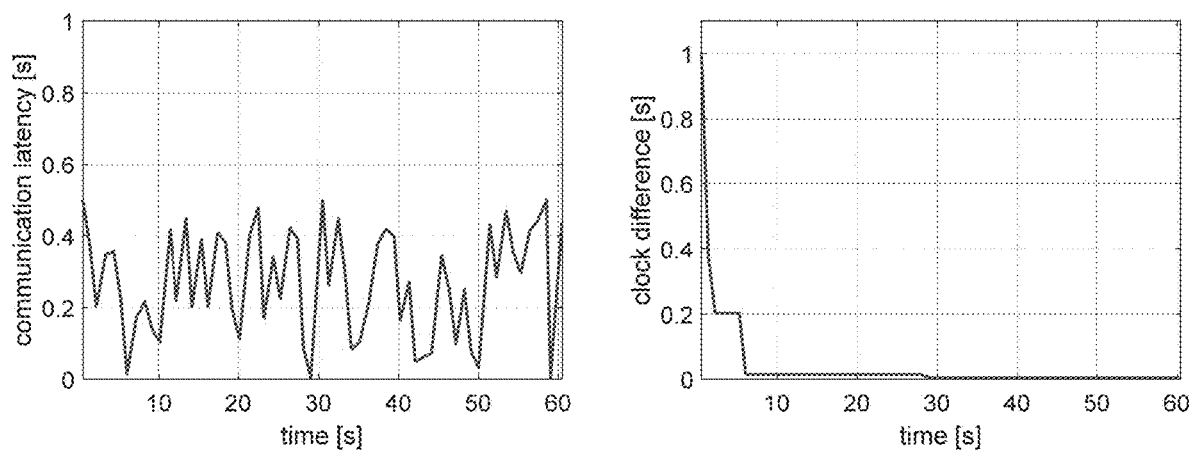
FIG. 7 provides graphs illustrating a simulation of the iterative synchronization technique illustrated with respect to FIG. 6.

FIG. 7 provides graphs illustrating a simulation of the iterative synchronization technique illustrated with respect to FIG. 6. The graph on the left shows simulated actual communication latencies over a period of 60 seconds. The graph on the right shows, for the simulation, differences between the virtual clock determined as a result of the iterative synchronization technique and an actual computer 110 internal clock. As can be seen, within approximately five or six seconds, the virtual clock is substantially synchronized, e.g., within 20 or 30 milliseconds of, the actual computer 110 internal clock.

Denote as p the possibility that the latency is below x milliseconds. Then, upon using the foregoing techniques to synchronize the virtual clock, the probability that the clock synchronization error is below x milliseconds after receiving n messages is given by $1-(1-p)^n$. Then suppose, for example, that x=10 and p=0.05, and let a confidence threshold be 99%. Then, after n=90 messages, we can be confident that the synchronization error is below 10 milliseconds. If a communication frequency is 10 Hz, then 9 seconds would need to elapse before there was sufficient confidence in the virtual clock synchronization. As a practical matter, the amount of time, e.g., number of milliseconds or seconds, needed for the virtual clock to be substantially synchronized could be determined for a communications device, e.g., a WiFi device in a communications module 150, can be determined by a device manufacturer, e.g., by empirical testing.

CONCLUSION

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

"Based on" encompasses "based wholly or partly on." If, herein, a first thing is described and/or claimed as being "based on" the second thing, then the first thing is derived or calculated from the second thing, and/or output from an algorithm, process, or program function that accepts some or all of the second thing as input and outputs some or all of the first thing.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:
    send a plurality of outbound messages to a remote device;
    record respective send times for each of the outbound messages;
    receive a plurality of inbound messages from the remote device, each of the inbound messages including a respective sent time from the remote device;
    store, in a receiver, a respective receipt time of each of the inbound messages that are identified as a response to one of the outbound messages;
    determine a plurality of communication latencies for each outbound message and corresponding inbound message;
    upon a determination that a first statistical measure of the communication latencies is below a first threshold and a second statistical measure is below a second threshold, adjust a clock of the computer based on a first difference between respective sent times and a second difference between respective receipt times; and upon a determination that the first statistical measure of the communication latencies is above the first threshold or the second statistical measure is above the second threshold, adjust the clock of the computer based on determining a decrease in successive differences between respective sent times and the second difference between respective receipt times.

2. The system of claim 1, wherein the instructions to adjust the clock of the computer further include instructions to adjust the clock of the computer with respect to a second clock of the computer.

3. The system of claim 1, wherein the first statistical measure or the second statistical measure include an average of the latencies, a standard deviation of the latencies, or a maximum value of the latencies.

4. The system of claim 1, wherein the remote device is mounted to a roadside infrastructure element.

5. The system of claim 1, wherein the computer is in a vehicle.

6. The system of claim 1, the instructions further comprising instructions to assign a timestamp to received sensor data based on the clock.

7. The system of claim 1, the instructions further comprising instructions to actuate a vehicle component based on the clock.

8. The system of claim 1, the instructions further comprising instructions to assign a timestamp to data from the remote device according to the adjusted clock of the computer.

9. The system of claim 1, the instructions further comprising instructions to update the adjusted clock after sending an additional outbound message and receiving an additional corresponding inbound message.

10. A method, comprising, sending a plurality of outbound messages to a remote device;

recording respective send times for each of the outbound messages;

receiving a plurality of inbound messages from the remote device, each of the inbound messages including a respective sent time from the remote device;

storing, in a receiver, a respective receipt time of each of the inbound messages that are identified as a response to one of the outbound messages;

determining a plurality of communication latencies for each outbound message and corresponding inbound message;

upon a determination that a first statistical measure of the communication latencies is below a first threshold and a second statistical measure is below a second threshold, adjusting a clock of the computer based on a first difference between respective sent times and a second difference between respective receipt times; and upon a determination that the first statistical measure of the communication latencies is above the first threshold or the second statistical measure is above the second threshold, adjusting the clock of the computer, based on determining a decrease in successive differences between respective sent times and the second difference between respective receipt times.

11. The method of claim 10, wherein adjusting the clock of the computer further includes adjusting the clock of the computer with respect to a second clock of the computer.

12. The method of claim 10, wherein the first statistical measure or the second statistical measure include an average of the latencies, a standard deviation of the latencies, or a maximum value of the latencies.

13. The method of claim 10, wherein the remote device is mounted to a roadside infrastructure element.

14. The method of claim 10, wherein the computer is in a vehicle.

15. The method of claim 10, further comprising assigning a timestamp to received sensor data based on the clock.

16. The method of claim 10, further comprising actuating a vehicle component based on the clock.

17. The method of claim 10, further comprising assigning a timestamp to data from the remote device according to the adjusted clock of the computer.

18. The method of claim 10, further comprising updating the adjusted clock after sending an additional outbound message and receiving an additional corresponding inbound message.

\* \* \* \* \*